March 24, 1931. W. A. KOSKEN 1,797,267
METHOD OF AND APPARATUS FOR OPTICAL RECTIFICATION
Filed Feb. 17, 1928 4 Sheets-Sheet 3
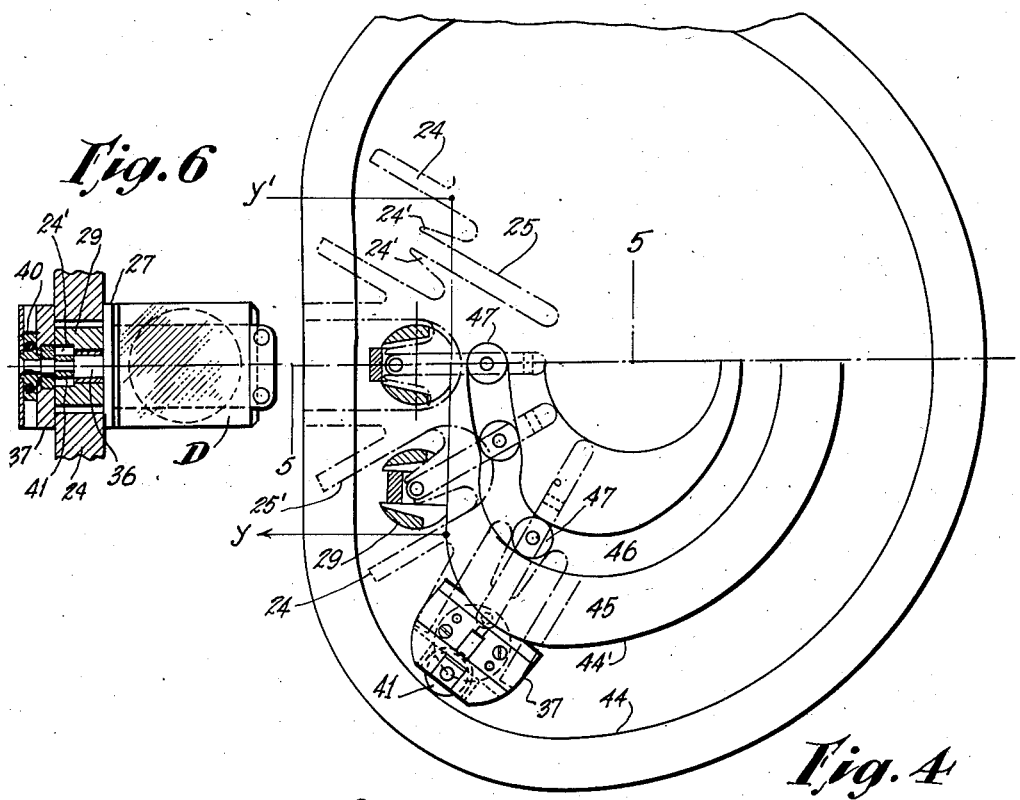
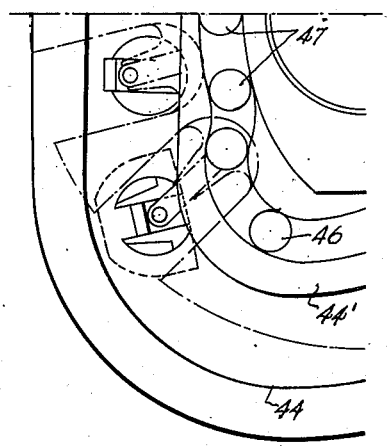
INVENTOR.
Wilho A. Kosken
BY
ATTORNEYS.

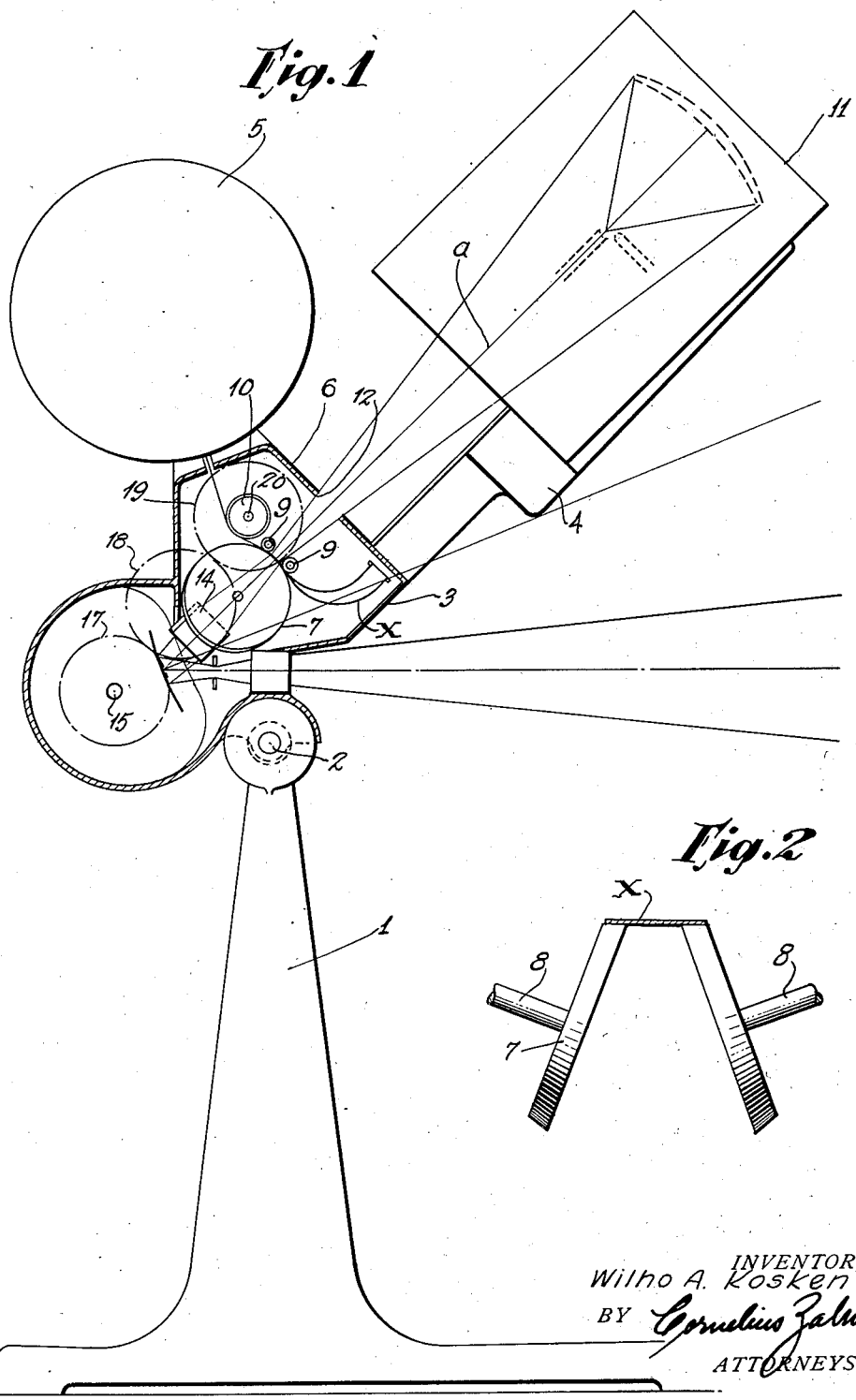

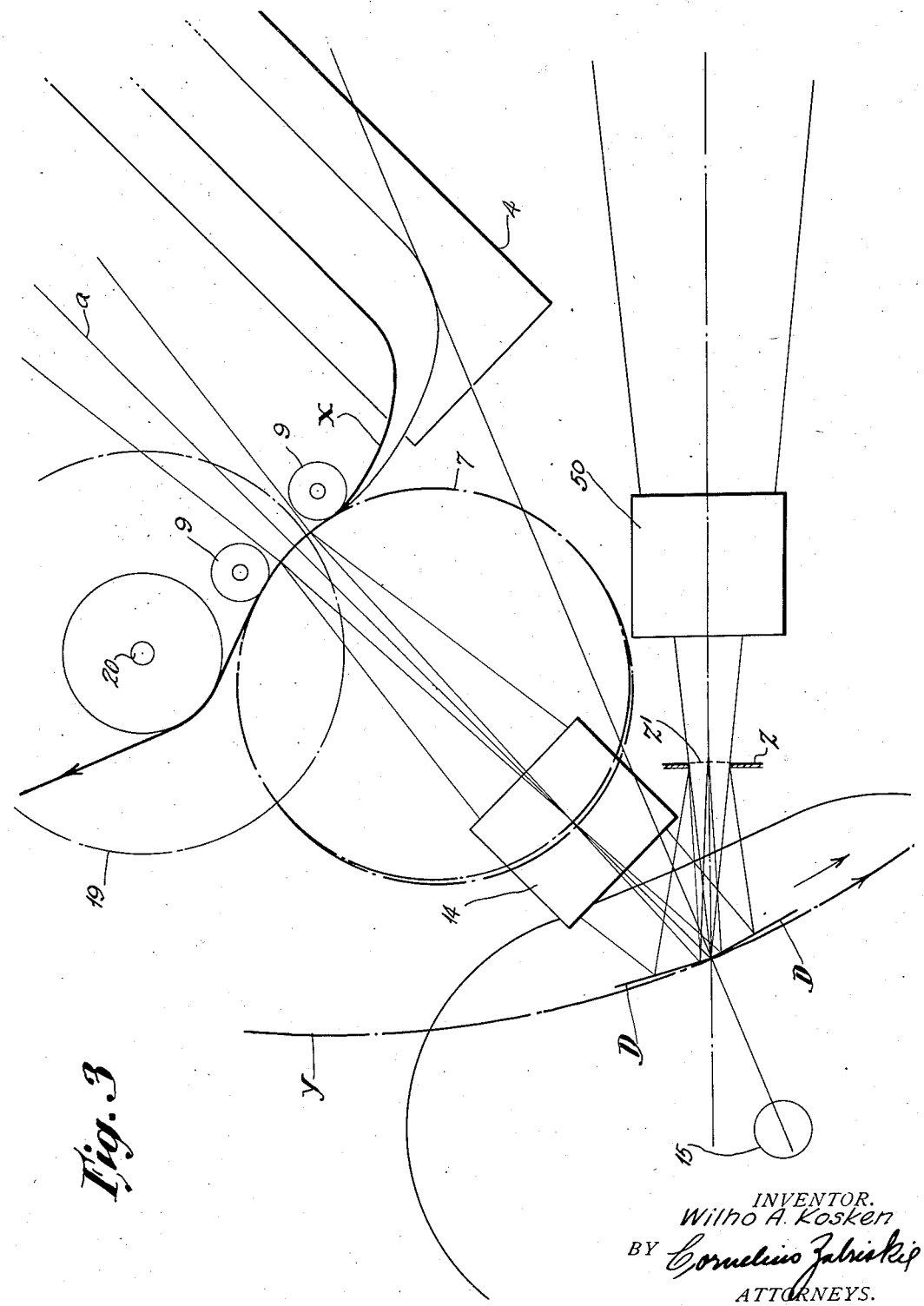

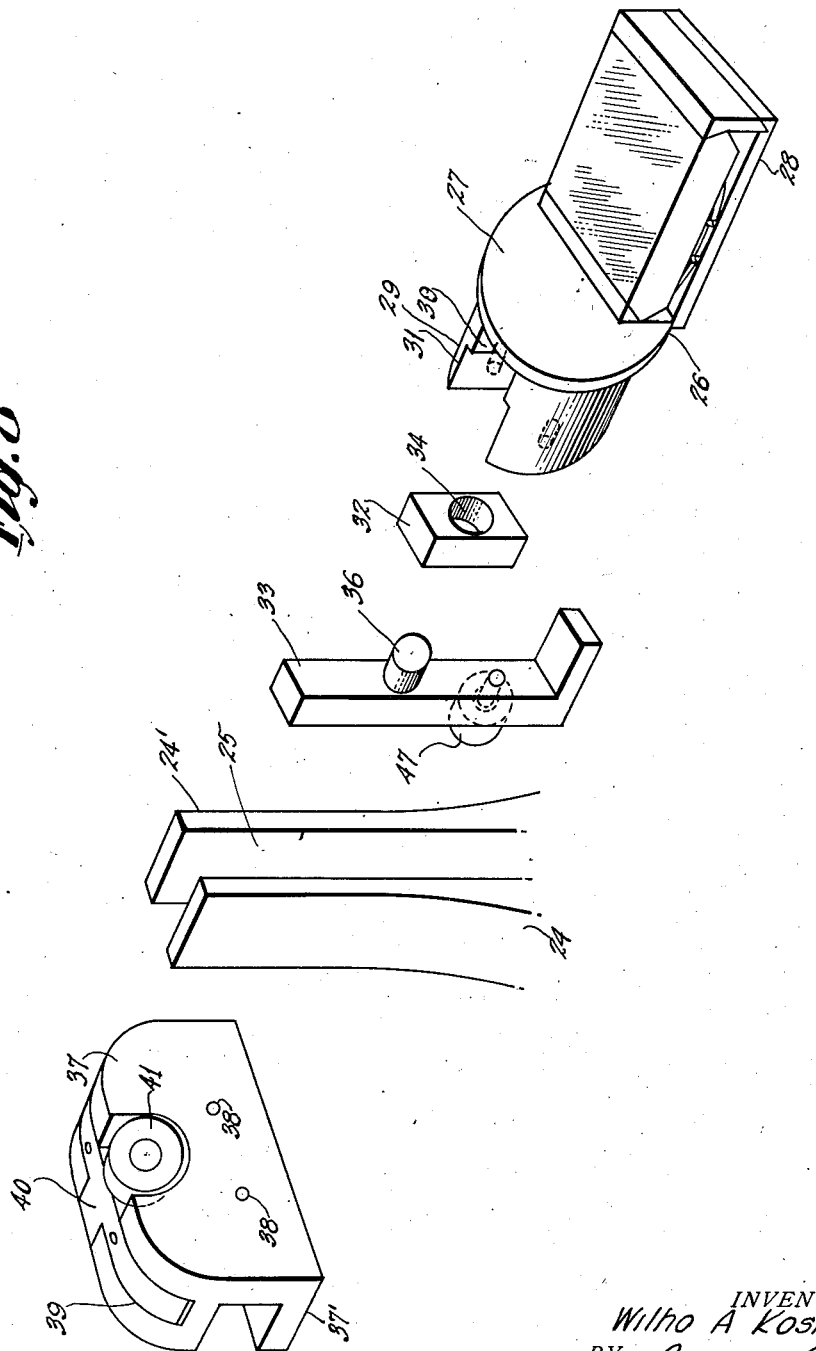

Patented Mar. 24, 1931

1,797,267

UNITED STATES PATENT OFFICE

WILHO A. KOSKEN, OF RICHMOND HILL, NEW YORK, ASSIGNOR, BY MESNE ASSIGNMENTS, TO JOHN A. INSLEE, OF NEW YORK, N. Y.

METHOD OF AND APPARATUS FOR OPTICAL RECTIFICATION

Application filed February 17, 1928. Serial No. 254,922.

This invention relates to a method of and apparatus for optical rectification, the invention being of particular advantage in connection with the motion picture art and the apparatus being of high utility and efficiency when employed either in a camera or projector.

The primary object of the invention is to simplify prior practice. Under prior practice, two distinct types of motion picture machines are generally known; first, that type of machine wherein the film is moved intermittently and a shutter is associated with the apparatus to intercept the light beam between the objective and the film or vice versa during the periods of movement of the film, and, second, that type of machine wherein the film moves continuously, no shutter is employed and the beam between the film and the lens is manipulated through the employment of moving deflectors. The practice typified by machines of the latter character is that to which the present invention relates.

In optical rectifiers of such latter class, it is the general practice to employ two or more series of moving deflectors cooperating with one another and with the source of light and the objective in such manner as to maintain the picture stationary on the screen through the proper coordination between the movements of the film and the deflectors.

It has generally been considered necessary in machines constructed in accordance with this practice to employ at least two series of moving deflectors. This necessitates the duplication of deflector operated mechanism which because of the nicety of adjustment and the workmanship required for the proper performance of the machine constitutes an important consideration in the cost of manufacture and maintenance. Furthermore, as moving parts are increased in number, more power is required to operate them. Vibration is apt to be present and it is altogether desirable that the number of moving parts of the structure be minimized.

With the foregoing considerations in mind, the method of the present invention, generally speaking, consists in passing a beam of light through a film which is curved on a predetermined radius at the aperture through which the beam is passed. Passing the beam through a lens for the purpose of producing a beam of the desired shape and for forming a secondary image in said beam, causing said beam, beyond the lens to impinge a series of moving deflectors, utilizing said deflectors to deflect the beam through another lens and causing the deflectors to travel along a curved path of such curvature that at a point between said deflectors and the second lens, the beam will embody a virtual secondary image of the primary image of the film, said secondary image being true and having all the qualities of the primary image on the film, except that the image will be stationary and will have a curvature closely approximating a cylindrical surface, and compensating for this curvature of the secondary image in the last mentioned lens for the purpose of giving a flat picture on the screen.

The apparatus of the present invention, generally speaking, embodies means for guiding a continuously moving film past an aperture and along a curvilinear path. When the apparatus is used as a projector, a suitable source of light is positioned coaxially of the aperture and a beam of light is projected through the aperture and through the film. Positioned beyond the film and placed to intercept the beam is a suitable lens, the purpose of which is to form the light beam which has passed through the film into a definite cone and which is capable of producing a secondary image of the desired predetermined size. Beyond the said lens and positioned to intercept the beam after it passes through the lens is a single series of deflectors. These deflectors are mounted in practice to travel along an endless path at a substantially uniform rate of speed and particularly is this the case while the deflectors are traveling through the zone of the light beams.

During the passage through this zone which may be divided into the zones of approach and recedence with respect to the axis of the beam, the deflectors are guided to move along a curvilinear path and these deflectors are operated during such movement to constantly and gradually change their angular relation with respect to the axis of the beam for the purpose of compensating for the constant movement of the film in order that the secondary image may be maintained stationary.

In the apparatus as stated, the film is curved at the aperture so as to be convex as viewed in the direction of the beam. When the film is thus curved at the aperture, the path of the deflectors during the zones of approach and recedence should be concave as viewed in the direction of the incident beam. The curves of these relative parts are so adjusted that the deflected beam will embody a curved virtual secondary image beyond which a lens is provided through which the beam is passed for the purpose of correcting or compensating for such curvature and producing a flat picture on a flat screen. In other words, the arrangement is such that all parts of the picture on the screen will be in exact focus.

In one of its preferred practical forms, the film is caused to travel continuously and is guided past the aperture by a pair of disks spaced apart to provide between them for the passage of the ray. These disks are preferably made fairly large and heavy so as to smoothly guide and steady the film during its operation and serve in effect the purpose of a fly wheel. With this arrangement, the movement of the film is unusually smooth and even and free from vibration. The disks preferably act upon non-parallel axes, so that they sufficiently diverge in the direction of movement of the beam to permit of widening of the beam and also to allow the first or primary lens to be positioned at least partially between these disks in order to produce a compact form of apparatus.

The deflectors are preferably mounted to operate as an individual movement which may be assembled and properly adjusted and thereupon introduced into and secured with relation to the rest of the apparatus without further adjustment. The feed of the film is, however, synchronized with the movement of the deflectors in such manner that the speeds of the respective parts may be properly controlled.

An important feature of this invention resides in the fact that the deflectors are positioned between the primary and secondary lenses and act upon the beam to produce the secondary image between these two lenses. It is between these lenses that the beam is best defined and most easily controlled and while in such condition, I have found that it may be very efficiently acted upon by the deflectors as stated for the purpose of compensating for movement of the film and the resulting production of a stationary secondary image. I have found that when the beam is thus manipulated, the most uniform lighting effects result.

A very important practical feature of the invention resides in the fact that with the method and apparatus of the present invention, the screen may be positioned at different distances from the apparatus and that special apparatus need not be designed for particular distances between the machine and the screen as has heretofore been universal in the proposed machines embodying but a single series of deflectors.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative only, and not as defining the limits of the invention.

Figure 1 is an elevation of a machine embodying the present invention showing certain portions of the apparatus in section in the interest of clearness.

Figure 2 is a diagrammatic view looking down on the guide disks of the film and showing the film in section.

Figure 3 is an enlarged diagrammatic view illustrating the path of the beam as it passes from the aperture at the film to and through the secondary lens.

Figure 4 is a face view of the apparatus for manipulating the deflectors and moving them along an endless path into and out of cooperative relation with the light beam. In this view, certain parts are shown in section in the interest of clearness and other parts are omitted in order that the structure may be clear.

Figure 5 is a section taken on the line 5—5 of Fig. 4. This is a radial section and shows the manner in which the deflectors are mounted and guided.

Figure 6 is a face view of one of the deflector holders showing immediately associated cooperating parts in section.

Figure 7 is a view similar to Fig. 4, but illustrating certain parts which are broken away in the former figure.

Figure 8 is a diagrammatic perspective view illustrating the parts shown in Fig. 6, but separated from one another in order that their individual structures may be apparent and the manner in which they cooperate may be understood.

The machine of this invention is preferably mounted upon a suitable stand 1, provided at its top with a universal joint 2 so that the superimposed parts of the apparatus may be tilted in any desired direction for the purpose well known to the art. These superimposed parts are all mounted upon a suitable frame 3 which is connected by the universal joint to the standard.

4 designates the feed drum and 5 the take up drum. The film is fed from the former to the latter drum through a casing 6 forming part of the frame 3. The film may be fed by means of a sprocket or by friction as may be desired, but in any event, it is essential that it be properly guided at the so-called aperture. The guiding means which I prefer to employ for this purpose is clearly shown in Figure 2 as embodying two idler disks 7. These idler disks are of frusto conical shape and are freely rotatable upon shafts 8 which are positioned in diverging relation to one another, so as to produce a diverging opening between the disks as shown in said figure. The film designated X in the drawing is adapted to bear against and ride on the peripheries of the disks 7 and said film is held for a portion of the periphery of the disks in engagement therewith by pressure rollers 9, as shown in Figure 1. The feed roll or sprocket is designated 10 in Figure 1.

11 designates a lamp house mounted on the frame 3 and of any suitable construction. Within this lamp house is positioned an appropriate source of illumination details of which are not considered necessary for the purpose of describing this invention. Any suitable source of light may be employed so long as the light is projected from such source through an opening 12 in the casing 6 and along the axis $a$ which passes centrally through the film at that portion thereof which corresponds to the aperture.

Beyond the film and preferably positioned at least partially between the disks 7 is a lens 14 which is placed coaxially of the axis $a$ and will hereinafter be referred to as the primary lens. The light from the source passes through the film to and through this lens and the film meanwhile is caused to move at a substantially constant and uniform speed, the disks 7 being in practice sufficiently heavy to function after the manner of a fly wheel whereby the operation of the film is steadied and vibration is minimized. Positioned within the casing 6 beyond the film 9 is a series of deflectors with means for moving these deflectors along a predetermined path whereby they are caused to successively intercept the beam of light projected along the axis $a$. I wish it clearly understood that I do not limit the present invention to the specific construction of the means whereby these deflectors are caused to so move in proper synchronism with the film, but for the purpose of illustration, I have shown in the accompanying drawings a practical form of mechanism which may be employed for this purpose. This apparatus is shown best in Figures 4 to 8 of the drawings.

Referring now particularly to these latter figures, 15 designates a shaft or spindle journalled in any suitable manner as by bearings 16 in the frame or casing 6 of the machine. To the shaft 15 is fixed a gear 17 meshing with the gear 18 which in turn meshes with a gear 19 fixed on the shaft 20 which drives the feed roll or sprocket 10. On the hub of the shaft 15 is fixed a pulley 21 which may be connected by a belt drive to the take up reel of the film.

The forward end of the spindle 15 is provided with a flange 22 and secured to this flange by means of screws 23 is a disk 24. This disk is thus made rigid with the spindle and is rotated thereby at a substantially constant or uniform speed. It will be noted particularly from Figure 4 that the disk is provided with a peculiar inner contour. This contour may vary without departing from the invention, but in any event the disk is provided with radial slots 25 between which slots the outer periphery of the disk is skeletonized to lighten weight and at the same time provided for uniform thickness throughout in order that the outer face of the disk may serve as a guide against which deflector holders 26 are adapted to slide during operation of the parts as will be hereinafter more fully explained.

In Figure 8, I have illustrated in perspective the various parts which are associated with each deflector holder, and by reference to this figure along with Figures 4 to 7, the manner in which the parts are associated will be clear from the description next to be advanced.

The deflector holder 26 embodies a base plate 27 which is generally circular in contour and from this base plate extends a shelf 28 having associated fastening devices to support the deflector D. Suitable adjusting means is associated with the shelf whereby accurate adjustment of the deflector may be accomplished.

Extending rearwardly from the base plate of the deflector holder is a circular boss 29 of a length equal to the thickness of the disk 24 and of a diameter adapting it to fit into cut outs 25' formed in the disk adjacent each slot. The boss 29 is recessed at 30 and 31 to receive two parts 32 and 33, respectively and the attenuated ends 24' are also adapted to extend into the recess 31.

The part 32 is a substantially rectangular block which fits into the recess 30 and is provided at its center with a circular hole 34. The part 33 is a slide of substantially L shaped configuration. This slide extends through the recesses 31 and carries a pin or roller 36 which extends into the hole 34 of the block 32. The slide 33 is of a width to provide a snug radial sliding fit with the slot 25.

Positioned rearwardly of the disk 24 is a follower member 37 perforated as shown at 38 and through these perforations screws are passed to thread into the rear end of the boss 29, so as to firmly fix the follower member to the deflector holder. The follower member is provided across its face with a slot 39 and in this slot is fitted a slide 40 which carries a roller 41. The slide 40 is provided with posts 42 (Fig. 5) and the spring 43 coacts with these posts to force the slide in an outward radial direction and maintain the roller 41 in engagement with an internal cam 44, while the base 37' of the follower member is held by pressure of the springs 43 against a cam surface 44' formed on the part 45. The cam surfaces 44 and 44' will be hereinafter referred to as follower cams.

Also mounted on the frame 6 is an additional cam 45' which forms with the cam 45 a cam slot 46 (Figures 4 and 7) and in this slot, which will be hereinafter referred to as the speed cam slot, operates a roller 47 which is carried by the slide 33.

The follower cam slot serves to control the direction of movement of the follower member 30 and consequently determines the path of the deflector holders in succession, while the speed cam controls the speed at which the followers are moved along the follower cam slot through rotation of the disk 24.

The followers move the deflectors in a continuous or endless path into and out of cooperation with the light beam projected along the axis $a$, and the shaping of the cam surface 44' from about the imaginary point designated $y$ in Figure 4 to about the imaginary point $y'$ of said figures is particularly important since from about the point $y$ to the point $y'$, the deflectors are moved through the zones of approach and recedence with respect to the beam.

As hereinbefore pointed out, the path of the deflectors at such times as the light beam impinges them is slightly concave as designated by the reference character Y in Figure 3, and the curve of this path which is determined by the curvature of the cam surface 44' between the points $y$ and $y'$ is carefully worked out, so that the incident rays which impinge the deflectors during their passage through the zones of approach and recedence will bring about deflection of the rays appropriate to produce a substantially true virtual secondary image in the reflected beam at about the point designated $z$ in Figure 3. In order to accomplish this result, it is not only necessary that the curvature of the cam surface be true and properly worked out, but it is also essential to proper projection that the speed of movement of the deflectors be properly timed. It is for this reason that the speed cam slot 46 is utilized and by proper formation of this slot as shown, the slide will be moved radially of the slots 25 of the disk, so that uniform rotation of the disk may be converted into such driving speed of the deflectors as is necessary to produce the result stated.

When the parts are in operation, the deflectors are moved along the path Y of Figure 3 and through their cooperation with the light beam compensate for the movement of the film and produce a stationary virtual secondary image at the point $z$. This secondary image will not be absolutely true when viewed in a geometrical plane as the virtual image is slightly rounded or convex as indicated in dotted lines at $z'$. Along the line $z'$ the virtual secondary image is true in the beam. A short distance beyond the line $z'$, the beam is passed through a lens 50 which compensates for the curvature of the virtual secondary image and renders it flat as it is projected upon the screen after passing through the lens 50. As a result, all parts of the picture on the screen are in accurate focus.

It will be apparent from the foregoing detailed description of the apparatus and the method of this invention that the structure of which the invention is susceptible is relatively simple as compared to prior apparatus for performing similar functions. An important feature of the present machine, however, resides in the fact that all parts of the image are in focus on the screen and that this is accomplished through the employment of a minimum number of parts. The parts of themselves are relatively simple in construction and are so constituted and arranged that they will not be apt to get out of order and to compensate for such slight wear to which they will be subjected in the normal operation of the machine. Due regard is had for the projection of a succession of stationary pictures without flicker or movement of the projected images and with all parts of the image in focus.

Attention is also directed to the fact that the deflectors which compensate for the movement of the image in the film cooperate with the beam between the primary and secondary lenses and at a point where the beam is most concentrated and most susceptible to accurate and efficient manipulation. The secondary virtual image is produced in the beam between the deflectors and the secondary lens and at this point designated $z'$ in the drawings, the image is stationary, so that when passed through the secondary lens for the purpose of compensating for the curvature of such virtual image, it may be projected on a screen positioned at varying distances from the apparatus. In other words, it is possible with the machine of this invention to position the screen at different distances from the apparatus and still obtain a proper focus of the picture on the screen. This is very unusual, if not impossible, with practically all devices of the prior art which have attempted to project images from a constantly moving film and through the employment of a single set of moving deflectors or lenses. The practical importance of this feature, inherent in the present invention will be immediately apparent to those skilled in the art.

In the machine which I have chosen to show in the accompanying drawings, the axis *a* of the light beam from the lamp house to the deflectors, as well as the axis of the deflected beam which passes through the secondary lens 50 and also the axis or line of movement which passes through the centers of the deflectors as they pass through the zones of approach and recedence and also the longitudinal medial line of the film at the aperture are all contained in a common geometric plane or substantially so in practice. This is a very desirable feature in that it enables the use of mechanism of relatively simple construction to produce substantially optically perfect projection. Accordingly, this is the preferred embodiment of the invention although not necessarily exclusive.

The foregoing detailed description sets forth the invention in its preferred practical form, and the invention is to be understood as fully commensurate with the appended claims.

Having thus fully described the invention, what I claim as new and desire to secure by Letters Patent is:

1. The herein described method which consists in passing a beam of light through a film which is curved on a predetermined radius, causing the film to move at a substantially uniform speed during the passage of such beam therethrough, passing the beam beyond the film through a lens for the purpose of producing a beam of definite shape embodying a secondary image, causing said beam to impinge beyond the lens upon consecutive deflectors moving successively along a curvilinear path, opposed to the direction of curvature of the film to intercept the beam and revolving said deflectors during their cooperative relation with the beam to compensate for the movement of the film and produce a stationary secondary image in the deflected beam.

2. The herein described method which consists in passing a beam of light through a film which is curved on a predetermined radius, causing the film to move at a substantially uniform speed during the passage of such beam therethrough, passing the beam beyond the film through a lens for the purpose of producing a beam of definite shape embodying a secondary image, causing said beam to impinge beyond the lens upon consecutive deflectors moving successively along a curvilinear path, opposed to the direction of curvature of the film to intercept the beam and revolving said deflectors during their cooperative relation with the beam to compensate for the movement of the film and produce a stationary secondary image in the deflected beam, and thereafter passing the beam with the secondary image therein through a second lens to focus the secondary image on the screen.

3. The herein described method which consists in causing a film to travel at a substantially uniform speed and along a curved path, passing a beam of light through a curved portion of the film, causing said beam to pass beyond the film through primary and secondary lenses, the former of which produces a beam of desired shape having therein a secondary image and the latter of which serves to focus the image on a suitable screen positioned beyond the secondary lens, and intercepting the beam between the primary and secondary lenses by a single series of moving deflectors traveling at a substantially uniform speed along a curved path, the curvature of which is opposed to the direction of curvature of the film successively into and out of cooperative relation to the beam with accompanying revolving movement adapted to compensate for movement of the film and produce a stationary secondary image in the beam before said beam is passed through the secondary lens.

4. The herein described method which consists in passing a beam of light through a film which is curved on a predetermined radius, causing the film to move at a substantially uniform speed during the passage of such beam therethrough, passing the beam beyond the film through a lens for the purpose of producing a beam of definite shape embodying a secondary image, causing said beam to impinge beyond the lens upon consecutive deflectors moving successively along a curvilinear path, opposed to the direction of curvature of the film to intercept the beam and revolving said deflectors during their cooperative relation with the beam to compensate for the movement of the film and produce within the deflected beam a stationary, curved, secondary virtual image, and thereafter passing said deflected beam through a secondary lens for the purpose of flattening the secondary image in the beam beyond the lens, whereby the picture projected upon a suitable plane screen beyond the secondary lens will be entirely in focus.

5. The herein described method which consists in projecting a beam of light having therein consecutively moving images, through stationary primary and secondary lenses in succession, intercepting the beam between said lenses by a plurality of deflectors moving consecutively into and out of cooperative relation with the beam along a predetermined path, and revolving said deflectors while in cooperative relation with the beam to compensate for the moving images in the projected beam for the purpose of producing the stationary images in the deflected beam, utilizing the secondary lens to focus the stationary image in the deflected beam with respect to a suitable screen, and causing the film and deflectors to travel along culvilinear paths, respectively opposed to one another in their respective directions of curvature, while in cooperative relation with the beam.

6. In rectifying apparatus for motion picture machines, a suitable source of light for projecting a beam along a predetermined path, stabilizing means for guiding a film through said beam at a uniform speed, a lens positioned beyond the film to intercept the beam and form said beam beyond said lens into the desired shape and extent, a plurality of deflectors, means for moving said deflectors consecutively along a predetermined path to successively intercept the beam, means for revolving said deflectors during impingement of the beam thereon to direct the beam in a predetermined direction and to compensate for movement of the image in the beam and produce in the beam a stationary virtual image, and a secondary lens positioned to intercept the deflected beam and focus it with respect to a suitable screen.

7. In rectifying apparatus for motion picture machines, a fly wheel mounted to rotate, means for drawing a film about a portion of the periphery of the fly wheel to impart movement to the fly wheel and simultaneously steadying the operation of the film, means for projecting a beam of light through a portion of the film contacting with the fly wheel, a primary lens positioned to intercept the beam beyond the film to form said beam into the desired shape and extent and to produce within the beam a secondary image, a series of deflectors, means for moving said deflectors consecutively along a predetermined path to intercept the beam, means for revolving said deflectors while impinged by the beam to produce a deflected beam having therein a stationary, secondary image, and a secondary lens positioned in the path of the deflected beam to focus said beam upon a suitable screen.

8. In rectifying apparatus for motion picture machines, a fly wheel mounted to rotate, means for drawing a film about a portion of the periphery of the fly wheel to impart movement to the fly wheel and simultaneously steadying the operation of the film, means for holding the film in firm contact with the periphery of the fly wheel to produce proper traction between the parts, means for projecting a beam of light through a portion of the film contacting with the fly wheel, and means positioned beyond the film to intercept the beam after passage through the film for the purpose of compensating for the movement of the images in the film and producing a stationary, secondary image in the beam which is adapted to be projected upon a suitable screen.

9. In rectifying apparatus for motion picture machines, means for moving the film at a uniform speed along an arcuate path, means for projecting a beam of light through the curved portion of the film, primary and secondary lenses positioned beyond the film and through which the beam of light is adapted to pass in succession, and deflectors positioned between the lenses and movable along an arcuate path opposed to the direction of curvature of the film to compensate for movement of the images in the beam and produce a stationary secondary image in the beam passing through the secondary lens.

10. In rectifying apparatus for motion picture machines, means for moving the film at a uniform speed along a curved path, means for projecting a beam of light through the film, a primary lens positioned in the path of the beam of light after it has passed through the film to form a secondary image of definite size in the beam beyond said lens, a series of moving deflectors positioned to intercept the beam beyond said lens and mounted to travel along a path curved oppositely to the curvature of the film path to compensate for the movement of the image in the beam and to deflect said beam with a stationary, secondary image therein, and a secondary lens positioned in the path of the deflected beam to focus the image upon a suitable screen.

11. In rectifying apparatus for motion picture machines, a pair of fly wheels having frusto conical peripheries positioned on converging axes and mounted to freely rotate in spaced relation to one another, means for causing the film to travel about portions of the peripheries of both fly wheels simultaneously to guide the film and insure uniform movement thereof, means for projecting a beam of light though that portion of the film engaging with the fly wheels, and means positioned beyond the film to compensate for movement of the image in the beam and render said image stationary therein, and means for focusing said image with respect to a suitable screen.

12. In rectifying apparatus for motion picture machines, a pair of fly wheels having frusto conical peripheries positioned on converging axes and mounted to freely rotate in spaced relation to one another, means for causing the film to travel about portions of the peripheries of both fly wheels simultaneously to guide the film and insure uniform movement thereof, means for projecting a beam of light through that portion of the film engaging with the fly wheels, a primary lens positioned to intercept the beam after it is passed through the film for the purpose of forming a secondary image in the beam, a series of deflectors, means for moving said deflectors along a predetermined, curvilinear path successively into and out of cooperative relation with the beam, means to revolve said deflectors while impinged by the beam to compensate for the movement of the images in the beam and form in said beam stationary, secondary images, and a lens positioned in the path of the deflected beam for the purpose of focusing the images in the deflected beam with respect to a suitable screen.

In testimony whereof I have signed the foregoing specification.

WILHO A. KOSKEN.